(12) United States Patent
Moore et al.

(10) Patent No.: US 10,400,700 B2
(45) Date of Patent: Sep. 3, 2019

(54) SEGMENTED CALIBRATION FOR AFTERTREATMENT OPTIMIZATION IN INTERNAL COMBUSTION ENGINE SYSTEM

(71) Applicant: Caterpillar Inc., Peoria, IL (US)

(72) Inventors: Paul Moore, Peoria, IL (US); Derek Tanis, Peoria, IL (US); Sylvain Charbonnel, Peoria, IL (US); Ry Colwell, Peoria, IL (US); Richard Breitzman, Chillicothe, IL (US)

(73) Assignee: Caterpillar Inc., Deerfield, IL (US)

( * ) Notice: Subject to any disclaimer, the term of this patent is extended or adjusted under 35 U.S.C. 154(b) by 162 days.

(21) Appl. No.: 15/611,317

(22) Filed: Jun. 1, 2017

(65) Prior Publication Data
US 2018/0347497 A1 Dec. 6, 2018

(51) Int. Cl.
*F01N 3/023* (2006.01)
*F02D 41/24* (2006.01)
(Continued)

(52) U.S. Cl.
CPC .......... *F02D 41/2451* (2013.01); *F01N 9/00* (2013.01); *F01N 11/00* (2013.01); *F02D 9/02* (2013.01); *F02D 41/0002* (2013.01); *F02D 41/029* (2013.01); *F02D 41/1446* (2013.01); *F02D 41/3017* (2013.01); *F02D 41/3836* (2013.01); *F02D 41/401* (2013.01); *F01N 3/023* (2013.01); *F01N 3/0231* (2013.01); *F01N 9/002* (2013.01); *F01N 11/002* (2013.01); *F01N 2260/04* (2013.01); *F01N 2430/00* (2013.01); *F01N 2430/06* (2013.01); *F01N 2430/08* (2013.01); *F01N 2560/025* (2013.01); *F01N 2560/06* (2013.01); *F01N 2900/08* (2013.01); *F01N 2900/1402* (2013.01); *F01N 2900/1404* (2013.01); *F02D 2200/0414* (2013.01); *F02D 2200/101* (2013.01); *F02D 2250/36* (2013.01); *F02D 2250/38* (2013.01)

(58) Field of Classification Search
CPC ............... F02D 41/146; F02D 41/1466; F02D 2200/101; F02D 2200/1002; F02D 2200/1004; F01N 3/023; F01N 3/0231
See application file for complete search history.

(56) References Cited

U.S. PATENT DOCUMENTS 5,067,460 A 11/1991 Van Duyne
7,401,462 B2 7/2008 Naik et al.
(Continued)

FOREIGN PATENT DOCUMENTS

KR 20050121320 A * 12/2005

OTHER PUBLICATIONS

Machine translation of KR 20050121320 A, accessed Jan. 4, 2019.*

*Primary Examiner* — Jonathan R Matthias
(74) *Attorney, Agent, or Firm* — Jonathan F. Yates

(57) ABSTRACT

An internal combustion engine system includes a control system with a monitoring mechanism producing data of engine operating state within a BMEP/speed envelope, and an electronic control unit structured to output a control command to vary at least one of a fuel delivery property or an air delivery property in the engine based on the data. Outputting the control command switches the engine between or among combustion modes that each satisfy different calibration criteria for optimizing aftertreatment function.

15 Claims, 2 Drawing Sheets

(51) Int. Cl.
*F02D 41/00* (2006.01)
*F02D 9/02* (2006.01)
*F02D 41/02* (2006.01)
*F01N 9/00* (2006.01)
*F01N 11/00* (2006.01)
*F02D 41/14* (2006.01)
*F02D 41/30* (2006.01)
*F02D 41/38* (2006.01)
*F02D 41/40* (2006.01)

(56) References Cited

U.S. PATENT DOCUMENTS 7,603,847 B2 10/2009 Sumilla et al.
7,797,923 B2 9/2010 Naik et al.
9,140,161 B2 9/2015 Galindo et al.

* cited by examiner

SEGMENTED CALIBRATION FOR AFTERTREATMENT OPTIMIZATION IN INTERNAL COMBUSTION ENGINE SYSTEM

TECHNICAL FIELD

The present disclosure relates generally to calibrating an internal combustion engine, and more particularly to calibrating an internal combustion engine according to different optimization criteria for aftertreatment function at different engine operating states.

BACKGROUND

Internal combustion engines are well known and widely used for power generation, vehicle propulsion, and virtually innumerable other purposes. In a typical internal combustion engine design a mixture of fuel and air is delivered into one or more cylinders formed in an engine housing, to ignite and drive linear motion of the piston by way of hot and expanding combustion gases. The linear motion of the piston is transformed into rotational motion of a crankshaft in a well-known manner. Combustion of the fuel and air produces engine exhaust which is discharged from the engine system commonly after one or more forms of exhaust aftertreatment.

Depending upon the type of internal combustion engine and other factors such as jurisdictional regulations it can be desirable to reduce, trap, eliminate or chemically transform various constituents of engine exhaust in the aftertreatment system. In the case of compression ignition diesel engines and the like, exhaust constituents in the nature of oxides of nitrogen or "NOx," particulate matter, and unburned hydrocarbons are desirably minimized during engine operation and commonly treated in the aftertreatment system, so long as engine performance and efficiency are not unduly impacted.

A great many different strategies for controlling combustion of fuel and air within an engine as well as treating exhaust that is produced have been proposed over the years. Strategies to cool the combustion process to reduce NOx production, such as by introducing recirculated exhaust gas, are used in some systems. Other strategies rely upon geometry of engine components, such as pistons, to affect NOx production or particulate matter production. It has been observed that many strategies require a shifting of a balance between NOx production and particulate matter production, such that production of these exhaust constituents is at least somewhat inversely related. Tilting the balance of NOx to particulate matter too much in one direction or the other can, however, create new challenges in the attempt to solve others. Manipulation of the combustion process within an engine can also undesirably affect efficiency or performance.

As noted above, various techniques can be used downstream from the engine to treat whatever exhaust constituents are desired to be reduced or eliminated. Many modern engines employ a so-called selective catalytic reduction module to reduce NOx ("SCR"), and a diesel particulate filter ("DPF") to reduce NOx and particulate matter, respectively. A diesel oxidation catalyst ("DOC") oxidizes organic constituents and carbon monoxide. The SCR module typically requires an on-board supply of reductant, and the DPF typically needs some mechanism or specialized engine operating technique to periodically regenerate. It will be readily appreciated that the interplay of the various technologies and available techniques for engine exhaust treatment and control of the combustion process is complex and sometimes unpredictable. It will also be recalled that degradation of performance or reductions in efficiency can accompany specialized engine operating techniques and specialized exhaust treatment equipment. The general complexity of such challenges is often reflected in the high level of sophistication employed in engine calibration. Presented with a group of many cross-coupled variables and non-linear relationships among engine operating parameters, engineers will often calibrate an engine to optimize to only one or a small number of criteria. Narrow and focused calibration or general operating strategies can have their advantages, but are not without shortcomings. By way of example, U.S. Pat. No. 5,067,460 to Van Duyne is directed to a variable air/fuel ratio engine, and proposes controlling a spark-ignition engine where fuel efficiency is maximized over an entire range of operating conditions.

SUMMARY OF THE INVENTION

In one aspect, an internal combustion engine system includes an internal combustion engine, a fuel system including an electrically actuated fuel control device, and an air system including an electrically actuated air control device. The engine system further includes an exhaust aftertreatment system structured to receive exhaust from the internal combustion engine, and a control system. The control system includes a monitoring mechanism structured to produce data indicative of transitioning of the internal combustion engine from a first operating state within a BMEP/speed envelope of the internal combustion engine to a second operating state within the BMEP/speed envelope. The control system further includes an electronic control unit coupled with each of the electrically actuated fuel control device, the electrically actuated air control device, and the monitoring mechanism. The electronic control unit is structured to output a control command to at least one of the electrically actuated fuel control device or the electrically actuated air control device that is based on the data indicative of transitioning of the internal combustion engine. The electronic control unit is further structured by way of the outputting of the control command to switch the internal combustion engine from a first combustion mode that produces a first exhaust output satisfying calibration criteria for the first operating state, to a second combustion mode that produces a second exhaust output satisfying calibration criteria for the second operating state.

In another aspect, a method of operating an internal combustion engine includes producing a signal indicative of transitioning the internal combustion engine from a first operating state within a BMEP/speed envelope of the internal combustion engine to a second operating state within the BMEP/speed envelope. The method further includes outputting a control command based on the signal to at least one of an electrically actuated fuel delivery device or an electrically actuated air delivery device in the internal combustion engine, and varying at least one of a fuel delivery property or an air delivery property of the internal combustion engine in response to the control command. The method further includes switching the internal combustion engine from a first combustion mode that produces a first exhaust output satisfying calibration criteria for the first operating state, to a second combustion mode that produces a second exhaust output satisfying calibration criteria for the second operating state, in response to the varying of the at least one of a fuel delivery property or an air delivery property.

In still another aspect, a combustion control system for an internal combustion engine includes a monitoring mechanism structured to produce data indicative of transitioning of the internal combustion engine from a first operating state within a BMEP/speed envelope of the internal combustion engine to a second operating state within the BMEP/speed envelope. The control system further includes an electronic control unit coupled with the monitoring mechanism and being structured to output a control command to at least one of an electrically actuated fuel control device or an electrically actuated air control device that is based on the data indicative of transitioning of the internal combustion engine. The electronic control unit is further structured by way of the outputting of the control command to switch the internal combustion engine from a first combustion mode that produces a first exhaust output satisfying calibration criteria for the first operating state, to a second combustion mode that produces a second exhaust output satisfying calibration criteria for the second operating state.

DETAILED DESCRIPTION

Figure 1:
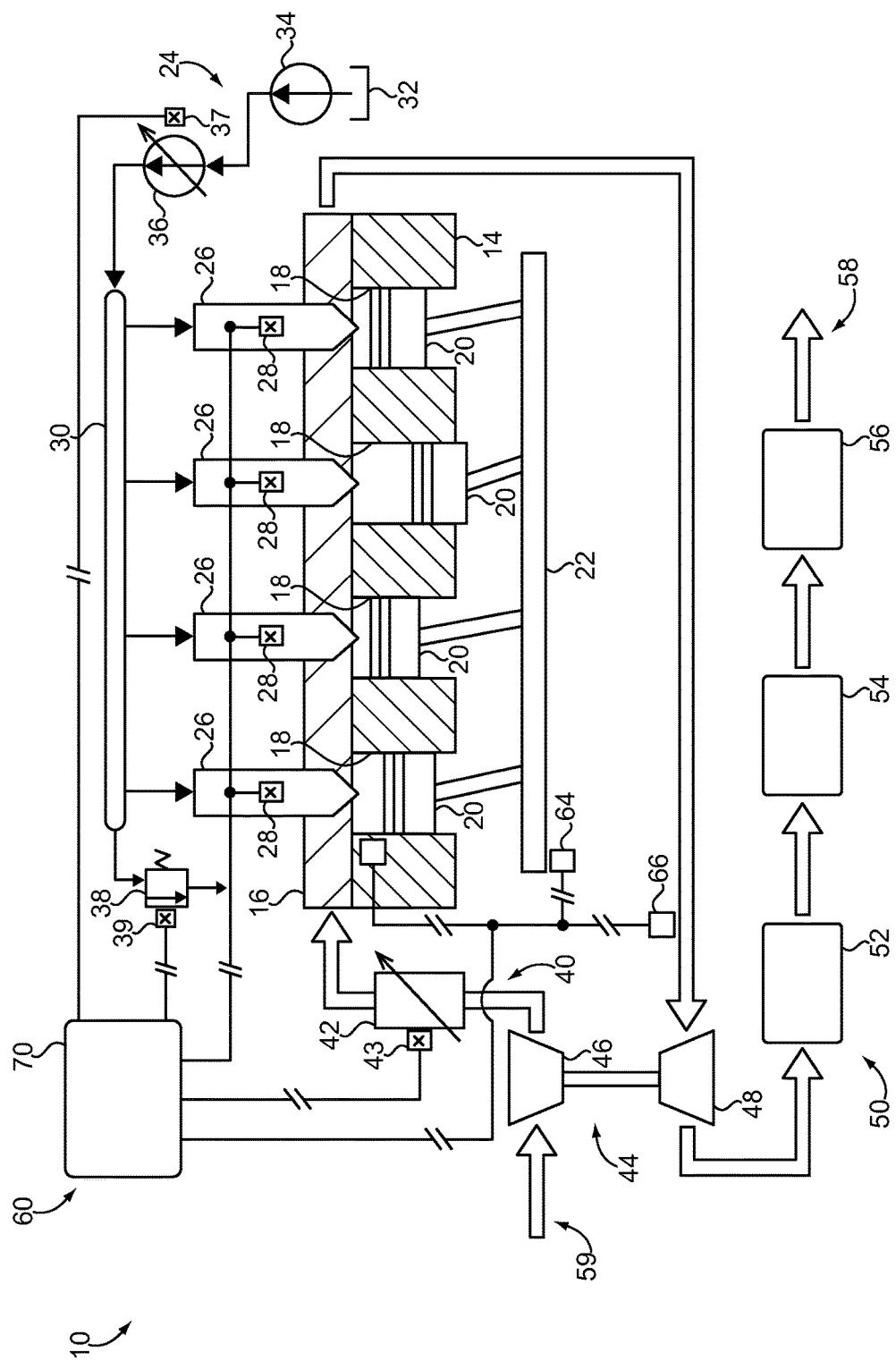
FIG. 1 is a diagrammatic view of an internal combustion engine system, according to one embodiment.

Referring to FIG. 1, there is shown an internal combustion engine system 10 according to one embodiment. Internal combustion engine system 10 (hereinafter "engine system 10") may include an internal combustion engine 12 that is a direct injected compression ignition diesel engine, however, the present disclosure is not thereby limited. Internal combustion engine 12 (hereinafter "engine 12") includes an engine housing 14 having a plurality of cylinders 18 formed therein, and an engine head 16 coupled to engine housing 14. Each of cylinders 18 may be equipped with a piston 20 reciprocable therein in a generally conventional manner to compress a mixture of air and injected fuel to produce hot, expanding combustion gases to rotate a crankshaft 22. Operation of engine system 10 produces exhaust gases or "exhaust" that can have a range of exhaust temperatures and emissions compositions. As will be further apparent from the following description, engine system 10 is uniquely adapted for operation in different combustion modes to tailor an exhaust output according to different criteria depending upon operating conditions.

Engine system 10 further includes a fuel system 24 having at least one electrically actuated fuel control device that is structured to vary a fuel delivery property in engine system 10. The at least one electrically actuated fuel control device can include one or more fuel injectors 26, each positioned at least partially within one of cylinders 18. Alternatively or additionally, the at least one electrically actuated fuel control device can include a high pressure fuel pump 36, or a fuel pressure control mechanism 38. Fuel pump 36 is equipped with an actuator 37 structured to vary a displacement of fuel pump 36 or meter a supply of fuel into fuel pump 36 or potentially a supply of fuel out of fuel pump 36. Fuel pressure control device 38 may include a pressure relief valve having an actuator 39. In an implementation, common rail 30 or another pressurized fluid reservoir is fluidly connected with each of fuel injectors 26. A fuel transfer pump 34 transfers fuel from fuel tank 32 to high pressure pump 36. Fuel pressure control mechanism 38 can selectively return fuel from common rail 30 to fuel tank 32, or otherwise to a low pressure space.

From the foregoing description it will be understood that a fuel delivery property as contemplated herein could include a fuel pressure property in the nature of fuel injection pressure. The fuel delivery property could also be an injection timing property. Still other properties of fuel delivery such as injection rate shapes, injection number, injection duration, the use of pre-injections or post-injections, or still other fuel delivery properties could be varied in furtherance of the aims of the present disclosure. It should be appreciated that while the description herein focuses on fuel injectors 26 being or including the subject at least one electrically actuated fuel control device, descriptions of fuel injectors 26 and their operation to vary a fuel delivery property should be understood to refer analogously to other components of fuel system 24 such as fuel pump 36 or device 38 whose operation can be adjusted or exploited to analogous ends.

Engine system 10 further includes an air system 40 having an electrically actuated air control device 42. In an implementation, electrically actuated air control device 42 can include an intake throttle valve having a throttle valve actuator 43 structured to adjust a position or state of throttle valve 42 to control a flow of air to internal combustion engine 12. Electrically actuated air control device 42 could include another valve such as a recirculation valve, a bypass valve, or still another valve capable of varying a pressure or a mass flow rate of air to engine 12 for combustion. Engine system 10 also includes a turbocharger 44 including a compressor 46 structured to receive an air input 59, and a turbine 48 coupled with compressor 46 and rotated by way of a flow of exhaust from engine 12. An air input 59 such as a filtered stream of air is shown fed to compressor 46 in FIG. 1.

Engine system 10 further includes an exhaust aftertreatment system 50 structured to receive exhaust from engine 12. Exhaust aftertreatment system 50 may include a diesel oxidation catalyst 52 or "DOC," a selective catalytic reduction or "SCR" module 54, and a diesel particulate filter 56 or "DPF." An exhaust output 58 of treated exhaust can be discharged from DPF 56 via a tailpipe or the like.

Engine system 10 further includes a control system 60 having a monitoring mechanism, which can include multiple separate devices or potentially a single device, structured to produce data indicative of transitioning engine 12 from a first operating state within a brake mean effective pressure ("BMEP")/speed envelope of engine 12 to a second operating state within the BMEP/speed envelope. In an implementation, the subject monitoring mechanism can include one or more of a cylinder or manifold pressure sensor 62, a crankshaft speed sensor 64, and an exhaust temperature sensor 66. Properties such as cylinder or intake manifold pressure, engine speed and exhaust temperature, as well as potentially fueling rates or fuel quantity information, can be used according to generally known techniques to determine where engine 12 is operating relative to an engine torque curve. It has been discovered that a plurality of different regions or operating states based on a present combination of BMEP and engine speed exist that can be exploited in calibrating engine system 10 according to different optimization criteria, as further discussed herein.

Control system 60 further includes an electronic control unit 70 coupled with each of electrically actuated fuel control device 26, electrically actuated air control device 42, and monitoring mechanisms 62, 64, 66. It should also be appreciated that the data of interest indicative of transitioning engine 12 from the first operating state to the second operating state, or vice versa, could be produced indirectly based upon observations as to mass air flow and fueling rate, or other factors. Accordingly, electronic control unit 70 could be coupled with other sensing mechanisms or operating mechanisms, such as actuators, than those described to produce the data of interest. Electronic control unit 70 is structured to output a control command to at least one of electrically actuated fuel control device 26 or electrically actuated air control device 42 that is based on the data indicative of transitioning of engine 12 from the first operating state to the second operating state. In an implementation, the data indicative of transitioning engine 12 could include data indicative of an increase in engine speed or a decrease in engine speed, as well as data indicative of an increase in engine torque or a decrease in engine torque. Those skilled in the art will appreciate that an engine torque curve and an engine BMEP curve are identical, thus engine torque and engine speed can be indicative of an operating state within the BMEP/speed envelope. The data can include or be encoded in one or more signals produced, for example, from one of mechanisms 62, 64, 66, or other mechanisms as described herein.

Electronic control unit 70 is further structured by way of the outputting of the control command to switch engine 12 from a first combustion mode that produces a first exhaust output satisfying calibration criteria for the first operating state, to a second combustion mode that produces a second exhaust output satisfying calibration criteria for the second operating state. In an implementation, the control command includes a control command energizing or deenergizing an electrical actuator 28 in one or more of fuel injectors 26 to vary fuel injection timing. The control command could, alternatively, include a command energizing or deenergizing actuator 39 to dump pressure from common rail 30, or a control command to actuator 37 to adjust fuel pump 36 to increase pressure in common rail 30. In the first combustion mode, engine 12 may be operated with a first combination of fuel injection timing and fuel injection pressure, whereas in the second combustion mode engine 12 may be operated with a second combination of fuel injection timing and fuel injection pressure. Other differences or variations in operating parameters to vary combustion mode will be apparent to those skilled in the art.

As noted above, engine system 10 may be switched by way of switching engine 12 from the first combustion mode producing a first exhaust output satisfying calibration criteria for the first operating state, to the second combustion mode producing a second exhaust output satisfying calibration criteria for the second operating state. The first exhaust output and the second exhaust output can differ with respect to at least one of expected exhaust temperature or expected exhaust composition produced in the corresponding first combustion mode or second combustion mode. It will be recalled that aftertreatment system 50 includes DPF 56. Those skilled in the art will appreciate that a conventional DPF needs to be regenerated either passively or actively periodically to remove trapped soot. The present disclosure contemplates application to reducing the need for active regeneration, at least in part by way of the unique segmented calibration disclosed herein.

To this end, the first exhaust output may satisfy calibration criteria that includes an expected exhaust temperature that is less than a passive regeneration temperature for DPF 56. The second exhaust output may satisfy calibration criteria that includes an expected exhaust temperature that is equal to or greater than a passive regeneration temperature for DPF 56. Another way to understand this subject matter is that some of the time engine 12 can be operated so as to produce exhaust having a temperature insufficient to passively regenerate DPF 56, such as an exhaust temperature less than 275° C. Other times engine 12 can be operated to produce exhaust having a higher temperature that is sufficient to passively regenerate DPF 56, such as an exhaust temperature of about 275° C. or greater. Since production of particulate matters can decrease, and NOx production increase, with increased exhaust temperature, engine 12 may be operated in different combustion modes to affect a rate at which DPF 56 fills even where passive regeneration conditions are not sought. In other words engine 12 may be operated to extend the fill time of DPF 56 so that the requirement for regeneration of any sort, active or passive, is delayed.

The first exhaust output may also satisfy calibration criteria for the first operating state that includes a first fuel efficiency criterion, and the second exhaust output may satisfy calibration criteria for the second operating state that include a second fuel efficiency criterion that is different from the first fuel efficiency criterion. The fuel efficiency criterion can include a brake specific fuel consumption (BSFC) level, for example. Those skilled in the art will appreciate that many engines are calibrated in a manner optimized for fuel efficiency across their entire operating range. In accordance with the present disclosure, the optimization or the relative importance of fuel efficiency (and other factors) can vary depending upon the operating state of engine 12. Thus, when engine 12 is in the first operating state within the BMEP/speed envelope, the applicable fuel efficiency criterion might have a first value, but a different value at the second operating state within the BMEP/speed envelope. The foregoing description suggests a first operating state within the BMEP/speed envelope, and a second operating state within the BMEP/speed envelope. It should be noted that no limitation is intended herein by use of the terms "first" or "second." Moreover, monitoring mechanisms 62, 64, 66 may be further structured to produce data indicative of transitioning engine 12 to a third operating state within the BMEP/speed envelope, and to output another control command to at least one of the electrically actuated fuel control device 26 or electrically actuated air control device 42, to switch engine 12 to a third combustion mode producing a third exhaust output satisfying calibration criteria for the third operating state.

From the foregoing description it can be appreciated that a first combustion mode might include a first combination of fuel injection timing, such as fuel injection at a given crank angle, a fuel injection pressure, and an air delivery property such as a mass air flow or an air pressure. The second combustion mode and the third combustion mode, and potentially still other combustion modes, can all have different combinations of these and other parameters, with the different combinations producing different exhaust outputs based on different relative importance of factors such as NOx, particulate matter, temperature, and potentially still others such as the fuel efficiency by which the given exhaust output was produced.

Figure 2:
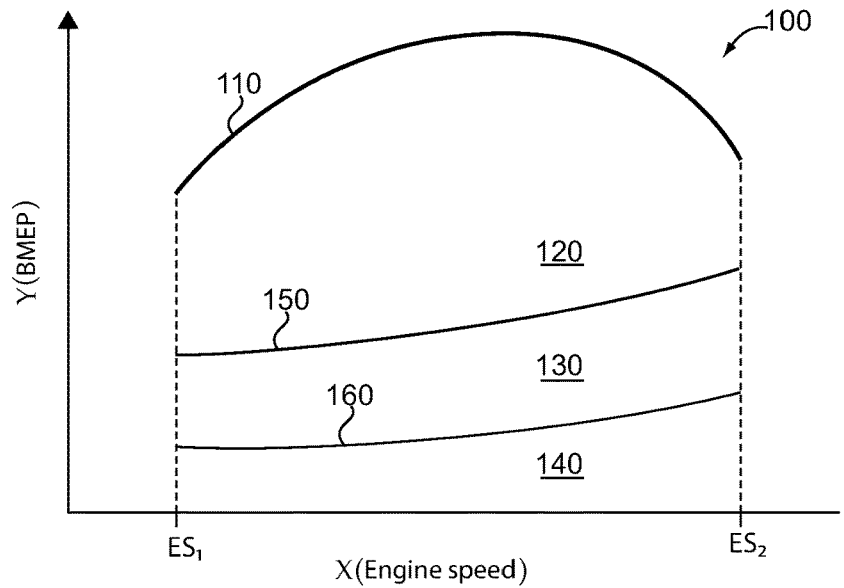
FIG. 2 is a graph illustrating a torque curve and a plurality of segmented calibration regions under the torque curve.

Referring also now to FIG. 2, there is shown a graph 100 illustrating an engine torque curve 110 with BMEP shown on the Y-axis and engine speed shown on the X-axis. A first calibration region 120 lies directly under torque curve 110, another calibration region 140 lies at a bottom of graph 100, and a middle calibration region 130 lies between calibration region 120 and calibration region 140. A constant exhaust temperature curve 150 separates region 120 from region 130, and another constant exhaust temperature curve 160 separates region 130 from region 140. These calibration regions 120, 130 and 140 have different and specific calibration optimization objectives to produce a desired engine operation and performance, namely, maximizing engine and aftertreatment performance integration. It will therefore be appreciated that the description herein of engine 12 transitioning between or among operating states within the BMEP/speed envelope can be understood as engine 12 transitioning between or among regions 120, 130, 140, which transition can be determined by observations of engine speed and BMEP or torque or factors having known relationships with BMEP, torque and engine speed. At an engine speed $ES_1$ engine 12 is operating at low idle, and at an engine speed $ES_2$ engine 12 is operating at a high idle.

When engine system 10, more particularly engine 12, is operating within the BMEP/speed envelope of region 120, it can generally be expected that exhaust temperature will have no trouble being sufficiently high for passive generation to occur. With high confidence that passive regeneration will occur the combustion mode by which engine 12 is operated can be optimized for minimizing BSFC or other measures of fuel efficiency while still meeting required hardware limitations. When engine 12 is operated in the BMEP/speed envelope of region 130 the combustion mode can be optimized for increasing exhaust temperature to ensure exhaust temperature sufficient for passive regeneration occurs as much of the time as is practical. Operation in region 130 contemplates sacrificing fuel efficiency to obtain the increased exhaust temperature. Those skilled in the art will also appreciate that increased combustion temperatures can be associated with increased NOx and reduced particulate matter. Accordingly, exhaust temperature can be maximized during operation in region 130 so long as NOx to particulate matter ratio limits, and hardware limits, are not exceeded. During operating engine 12 in region 140 it can be assumed that exhaust temperature will be unlikely to reach a temperature sufficient for passive regeneration, and engine 12 can therefore be operated to minimize particulate matter, to prolong fill time of DPF 56 but with no expectation that passive regeneration will ever occur. It can therefore be appreciated that switching engine 12 from the first combustion mode to the second combustion mode, from the second combustion mode to the third combustion mode, et cetera, can include switching engine 12 so as to produce a different exhaust temperature in one of the combustion modes than in the other of the combustion modes. Switching of engine 12 between or among combustion modes can also include switching engine 12 such that an exhaust output in one of the combustion modes has a different balance of NOx to particulate matter than a balance of NOx to particulate matter of the exhaust output in the other of the combustion modes. It has also been observed that fuel injection pressure can affect NOx output, potentially for the reason that increased injection pressure results in a faster rate of fuel injection with the fuel combusting over a relatively shorter period of time. Transitioning from operation in region 130 where maximizing exhaust temperature might be paramount to region 140 where maximizing exhaust temperature is not paramount could include reducing fuel injection pressure. Transitioning from region 130 to region 140 could include retarding injection timing. Those skilled in the art will contemplate still other variables that can be adjusted to transition between and among combustion modes consistent with the objectives set forth herein.

INDUSTRIAL APPLICABILITY

Figure 3:
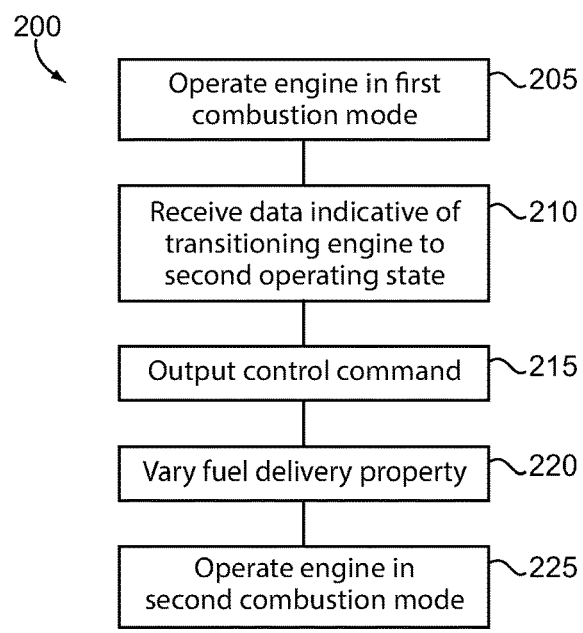
FIG. 3 is a flowchart illustrating example operation and control logic flow, according to one embodiment.

Referring also now to FIG. 3, there is shown a flowchart 200 illustrating example methodology and control logic flow according to one embodiment. In flowchart 100, engine 12 is operated in a first combustion mode at block 205. From block 205, the process advances to block 210 to receive data indicative of transitioning engine 12 from the first operating state to the second operating state as described herein. From block 210, the process may advance to block 215 to output a control command to at least one of fuel control device 26 or to air control device 42 based on the data received at block 210. From block 215, the process may advance to block 220 to vary the fuel delivery property in a manner that is responsive to the control command as discussed herein. From block 220, the process may advance to block 225 to operate engine 12 in the second combustion mode.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. An internal combustion engine system comprising:
an internal combustion engine;
a fuel system including an electrically actuated fuel control device;
an air system including an electrically actuated air control device;
an exhaust aftertreatment system structured to receive exhaust from the internal combustion engine and including a particulate filter;
a control system including a monitoring mechanism structured to produce data indicative of transitioning of the internal combustion engine from a first operating state within a middle region of a BMEP/speed envelope of the internal combustion engine to a second operating state within a lower region of the BMEP/speed envelope;
the control system further including an electronic control unit coupled with each of the electrically actuated fuel control device, the electrically actuated air control device, and the monitoring mechanism;
the electronic control unit being structured to output a control command to at least one of the electrically actuated fuel control device or the electrically actuated air control device that is based on the data indicative of transitioning of the internal combustion engine; and
the electronic control unit being further structured by way of the outputting of the control command to:
switch the internal combustion engine from a first combustion mode that produces a first exhaust output satisfying calibration criteria for the first operating state, including an exhaust temperature in the exhaust aftertreatment system sufficient for passive regeneration of the particulate filter, to a second combustion mode that produces a second exhaust output satisfying calibration criteria for the second operating state, including an exhaust temperature in the exhaust aftertreatment system insufficient for passive regeneration of the particulate filter; and
shift a balance of NOx to particulate matter in exhaust produced by the internal combustion engine based on the switching of the internal combustion engine from the first combustion mode to the second combustion mode.

2. The system of claim 1 wherein the electrically actuated fuel control device includes a fuel injector or a fuel pressure control mechanism, and the electrically actuated air control device includes an intake throttle valve.

3. The system of claim 2 wherein the control command varies the fuel injection timing or the fuel injection pressure to switch the internal combustion engine from a first combination of fuel injection timing and fuel injection pressure in the first combustion mode to a second combination of fuel injection timing and fuel injection pressure in the second combustion mode.

4. The system of claim 1 wherein the monitoring mechanism is further structured to produce data indicative of transitioning the internal combustion engine to a third operating state within the BMEP/speed envelope, and to output another control command to at least one of the electrically actuated fuel delivery device or the electrically actuated air delivery device to switch the internal combustion engine to a third combustion mode producing a third exhaust output satisfying calibration criteria for the third operating state.

5. The system of claim 1 wherein the first exhaust output satisfies calibration criteria for the first operating state that include a first fuel efficiency criterion, and the second exhaust output satisfies calibration criteria for the second operating state that include a second fuel efficiency criterion that is different from the first fuel efficiency criterion.

6. A method of operating an internal combustion engine comprising:
producing a signal indicative of transitioning the internal combustion engine from a first operating state within a first region of a BMEP/speed envelope of the internal combustion engine to a second operating state within a lower region of the BMEP/speed envelope;
outputting a control command based on the signal to at least one of an electrically actuated fuel delivery device or an electrically actuated air delivery device in the internal combustion engine;
varying at least one of a fuel delivery property or an air delivery property of the internal combustion engine in response to the control command;
switching the internal combustion engine from a first combustion mode that produces a first exhaust output satisfying calibration criteria for the first operating state, to a second combustion mode that produces a second exhaust output satisfying calibration criteria for the second operating state, in response to the varying of the at least one of a fuel delivery property or an air delivery property; and
reducing an exhaust temperature in an exhaust aftertreatment system for the internal combustion engine to an exhaust temperature insufficient for passive regeneration of a particulate filter in the exhaust aftertreatment system, and shifting a balance of NOx to particulate matter in exhaust produced by the internal combustion engine, based on the switching of the internal combustion engine from the first combustion mode to the second combustion mode.

7. The method of claim 6 further comprising producing a second signal indicative of transitioning the internal combustion engine to a third operating state within the BMEP/speed envelope.

8. The method of claim 7 further comprising outputting a second control command based on the second signal to at least one of the electrically actuated fuel delivery device or the electrically actuated air delivery device to vary at least one of a fuel delivery property or an air delivery property and switch the internal combustion engine to a third combustion mode that produces a third exhaust output satisfying calibration criteria for the third operating state.

9. The method of claim 6 wherein the electrically actuated fuel delivery device includes a fuel injector, and wherein the outputting of the control command further includes outputting the control command to vary a timing of fuel injection between the first combustion mode and the second combustion mode.

10. The method of claim 6 wherein the electrically actuated fuel delivery device includes a fuel pressure control device, and wherein the outputting of the control command further includes outputting the control command to vary a pressure of fuel injection between the first combustion mode and the second combustion mode.

11. A combustion control system for an internal combustion engine comprising:
a monitoring mechanism structured to produce data indicative of transitioning of the internal combustion engine from a first operating state within a BMEP/speed envelope of the internal combustion engine to a second operating state within the BMEP/speed envelope;
an electronic control unit coupled with the monitoring mechanism and being structured to output a control command to at least one of an electrically actuated fuel control device or an electrically actuated air control device that is based on the data indicative of transitioning of the internal combustion engine; and
the electronic control unit being further structured by way of the outputting of the control command to:
vary at least one of a fuel delivery property or an air delivery property of the internal combustion engine based on the control command;
switch the internal combustion engine, based on the varying of at least one of a fuel delivery property or an air delivery property, from a first combustion mode that produces a first exhaust output satisfying calibration criteria for the first operating state, to a second combustion mode that produces a second exhaust output satisfying calibration criteria for the second operating state; and
extend a fill time of a particulate filter in an exhaust aftertreatment system for the internal combustion engine based on the switching of the internal combustion engine from the first combustion mode to the second combustion mode.

12. The control system of claim 11 wherein the electronic control unit is further structured to switch the internal combustion engine to the second combustion mode such that the second exhaust output has a different exhaust temperature than an exhaust temperature of the first exhaust output.

13. The control system of claim 12 wherein the electronic control unit is further structured to switch the internal combustion engine to the second combustion mode such that the second exhaust output has a different exhaust composition than an exhaust composition of the first exhaust output.

14. The control system of claim 13 wherein the exhaust composition of the first exhaust output and the second exhaust output includes a balance of NOx to particulate matter.

15. The control system of claim 11 wherein the electrically actuated fuel control device includes a fuel injector or a fuel pressure control mechanism, and wherein the control command varies the fuel injection timing or the fuel injection pressure to switch the internal combustion engine from a first combination of fuel injection timing and fuel injection pressure in the first combustion mode to a second combination of fuel injection timing and fuel injection pressure in the second combustion mode.

\* \* \* \* \*